Dec. 28, 1965 J. M. EITEL 3,226,087

MULTIPLE CONDUCTOR STRINGING APPARATUS

Filed March 6, 1961 10 Sheets-Sheet 1

INVENTOR.
Jay M. Eitel
BY
Flehr and Swain
Attorneys

MULTIPLE CONDUCTOR STRINGING APPARATUS

Filed March 6, 1961 10 Sheets-Sheet 2

INVENTOR.
Jay M. Eitel
BY Flehr and Swain
Attorneys

Dec. 28, 1965 J. M. EITEL 3,226,087

MULTIPLE CONDUCTOR STRINGING APPARATUS

Filed March 6, 1961 10 Sheets-Sheet 3

INVENTOR.
Jay M. Eitel
BY Flehr and Swain
Attorneys

Dec. 28, 1965 J. M. EITEL 3,226,087

MULTIPLE CONDUCTOR STRINGING APPARATUS

Filed March 6, 1961 10 Sheets-Sheet 4

INVENTOR.
Jay M. Eitel
BY [signature]
Attorneys

Dec. 28, 1965 J. M. EITEL 3,226,087

MULTIPLE CONDUCTOR STRINGING APPARATUS

Filed March 6, 1961 10 Sheets-Sheet 5

INVENTOR.
Jay M. Eitel
BY Fleher and Swain
Attorneys

Dec. 28, 1965 J. M. EITEL 3,226,087

MULTIPLE CONDUCTOR STRINGING APPARATUS

Filed March 6, 1961 10 Sheets-Sheet 6

INVENTOR.
Jay M. Eitel
BY Flehr and Swain
Attorneys

INVENTOR.
Jay M. Eitel
BY Fleh and Swain
Attorneys

Dec. 28, 1965 J. M. EITEL 3,226,087

MULTIPLE CONDUCTOR STRINGING APPARATUS

Filed March 6, 1961 10 Sheets-Sheet 8

INVENTOR.
Jay M. Eitel
BY Flehr and Swain
Attorneys

INVENTOR.
Jay M. Eitel
BY [signature]
Attorneys

INVENTOR.
Jay M. Eitel
BY [signature]
Attorneys

United States Patent Office 3,226,087

Patented Dec. 28, 1965

3,226,087

MULTIPLE CONDUCTOR STRINGING APPARATUS

Jay M. Eitel, Los Altos, Calif., assignor to Telsta Corp., San Carlos, Calif., a corporation of California Filed Mar. 6, 1961, Ser. No. 93,684

23 Claims. (Cl. 254—134.3)

This invention relates to a multiple conductor stringing apparatus and more particularly to a self-propelled multiple conductor stringing apparatus.

In the past, in stringing multiple conductors such as those utilized for power distribution lines, it has been the practice to utilize several crews of men in stringing the multple conductors. In view of the increasing cost of labor, there is a necessity for providing apparatus which makes possible the stringing of multiple conductors with a minimum of labor and equipment.

In general, it is an object of the present invention to provide a multiple conductor stringing apparatus by which multiple conductors can be strung simultaneously from a self-propelled vehicle.

Another object of the invention is to provide apparatus of the above character which has a very favorable weight distribution.

Another object of the invention is to provide apparatus of the above character in which reel carrying trailers are not required.

Another object of the invention is to provide apparatus of the above character in which the conductors can be payed from either the right-hand side or the left-hand side of the vehicle.

Another object of the invention is to provide apparatus of the above character in which a switch can be made in paying out the cable from one side of the vehicle to the other side of the vehicle in mid-span.

Another object of the invention is to provide apparatus of the above character in which the reels can be loaded and unloaded from the vehicle without cutting the conductors.

Another object of the invention is to provide apparatus of the above character in which the conductors can be sagged or pulled to final tension from the vehicle.

Another object of the invention is to provide apparatus of the above character in which the conductors can be tensioned individually.

Another object of the invention is to provide apparatus of the above character in which the tension on the conductors can be adjusted as the conductors are being payed out.

Another object of the invention is to provide apparatus of the above character in which the tension on the conductors as they are payed out is adjusted automatically.

Another object of the invention is to provide apparatus of the above character in which the conductors can be sagged by rotation of the reels on which the conductors are wound.

Another object of the invention is to provide apparatus of the above character in which the conductors can be automatically sagged by operation of control means.

Another object of the invention is to provide apparatus of the above character in which individual drag brakes are provided for each reel and a tensioning motor is provided for each reel.

Another object of the invention is to provide apparatus of the above character in which the reels can be readily loaded and unloaded.

Another object of the invention is to provide apparatus of the above character in which the reels can be loaded and unloaded by the boom structure.

Another object of the invention is to provide apparatus of the above character in which multiple bull wheels are provided on the vehicle for guiding the conductors as they are payed out.

Another object of the invention is to provide apparatus of the above character in which additional conductor guiding means is mounted on the boom structure and in which the additional conductor guiding means is adjustable in position with respect to the boom structure.

Another object of the invention is to provide apparatus of the above character which can be operated with a minimum number of personnel.

Another object of the invention is to provide apparatus of the above character in which means is provided for storing additional reels.

Additional objects and features of the invention will appear from the following description in which the preferred embodiment is set forth in detail in conjunction with the accompanying drawings.

Referring to the drawings.

Figure 1:
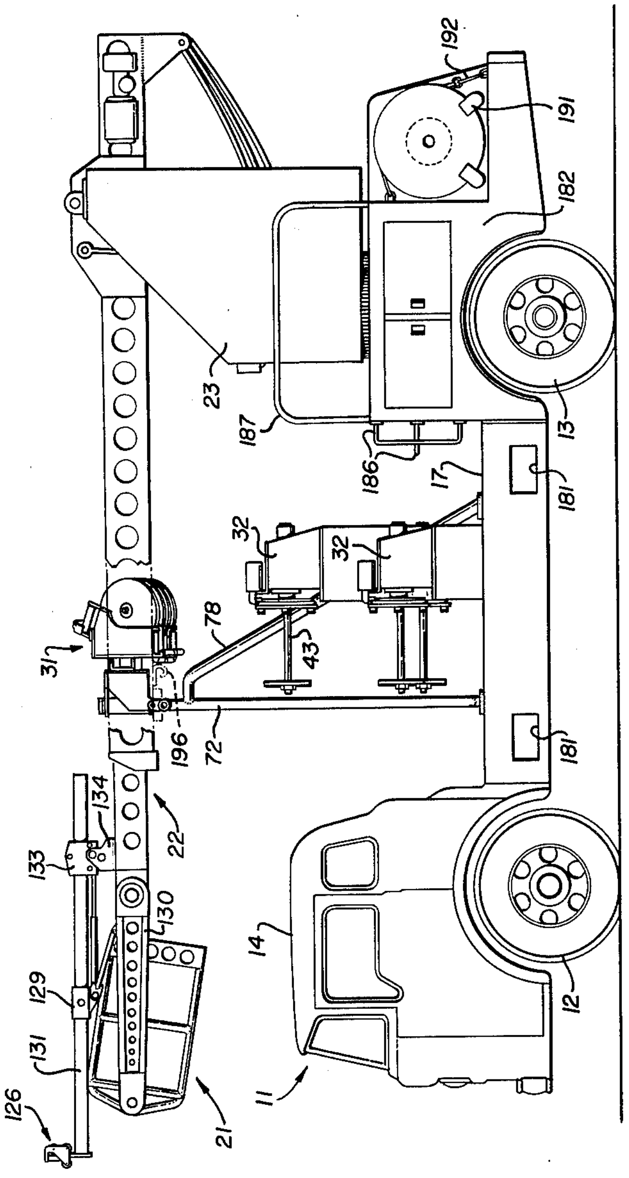
FIGURE 1 is a side elevational view of my multiple conductor stringing apparatus in a stored or travelling position.

In general, my multiple conductor stringing apparatus utilizes a self-propelled vehicle of the type having a cab mounted on one end of the frame. A boom structure is mounted on the frame and is of the type in which the outer end of the boom structure can be moved toward or away from the vehicle. A plurality of conductor carrying reels are rotatably mounted on the frame ahead of the boom structure and behind the cab. A plurality of bull wheels are mounted on the vehicle adjacent the reels. Each of the bull wheels is adapted to guide one of the conductors as the conductors are payed from the reels.

Additional means is normally provided on the boom structure for also guiding the conductors as they are being strung. Drag brake means is provided on each of the reels for adjusting the tension of the conductors as they are payed from the reels. Motorized means is provided for rotating each of the reels so that the conductors can be sagged or tensioned individually from the vehicle.

The multiple conductor stringing apparatus illustrated in the drawings consists of a motorized vehicle 11 having front and rear wheels 12 and 13 with a cab 14 of a suitable type such as a tilt-up cab mounted on the front end of the vehicle and enclosing the engine and the operator's driving station in a manner well known to those skilled in the art. The vehicle also includes a frame 16 upon which is mounted a platform 17.

An aerial platform of a suitable type such as the workman's basket 21 shown in the drawings is carried by the vehicle 11. The aerial platform 21 can be supported in any suitable manner upon the vehicle 11 so long as it forms suitable means for moving the aerial platform to the desired positions. For example, as shown in the drawings, such means can take the form of apparatus described in my Patents 2,841,404; 2,938,594; and 2,896,-750. As disclosed in these patents, such apparatus consists of an extensible boom assembly 22 which has its outer end connected to the workman's basket 21 and which is pivotally carried by a lift supporting structure 23. The lift supporting structure 23 is mounted on the framework 16 and, as shown in the drawings, is spaced a substantial distance above the framework to make it possible to raise the workman's basket 21 to higher elevations. Stabilizing means (not shown), as disclosed in my Patent No. 2,841,404, is connected to the lift supporting structure 23.

As described in my copending application Serial No. 560,621, filed January 23, 1956, now U.S. Patent No. 3,055,459, means is provided for rotating the lift supporting structure 23 about a vertical axis. As also described in my copending application, means is provided for raising and lowering the outer end of boom structure 22 about a horizontal axis carried by the lift supporting structure. Means (not shown), as described in my Patent No. 2,896,750, is provided for extending and retracting the inner boom with respect to the outer boom of the boom structure 22. Control means (not shown) is provided in the workman's basket so that the operator in the workman's basket can control his positioning by operating the means utilized for rotation, raising and lowering, and extension of the boom structure as disclosed in my Patents No. 2,627,560 and No. 2,841,659.

From the foregoing description, it can be seen that the workman's basket or aerial platform 21 can be moved to any desired position with respect to the vehicle.

Reel carrying means is mounted on the platform 17 between the lift supporting structure 23 and the cab 14. The reel carrying means consists of a plurality of spindle assemblies 27. Any desired number of spindle assemblies can be utilized. For example, as shown in the drawings, it may be desirable to utilize four such spindle assemblies to permit four conductors to be strung at the same time. The spindle assemblies 27 are adapted to carry reels 28 upon which are wound the conductors 29. Means is provided for guiding the conductors as they are payed from the reels and consists of a castered bull wheel cluster or assembly 31 mounted on the platform 17 and located adjacent the reels 28. The bull wheel assembly 31 and the spindle assemblies 27 are positioned in a predetermined manner as hereinafter described to facilitate the paying of the conductors from the reels from both sides of the vehicle, while at the same time placing minimum bends in the conductors.

Figure 5:
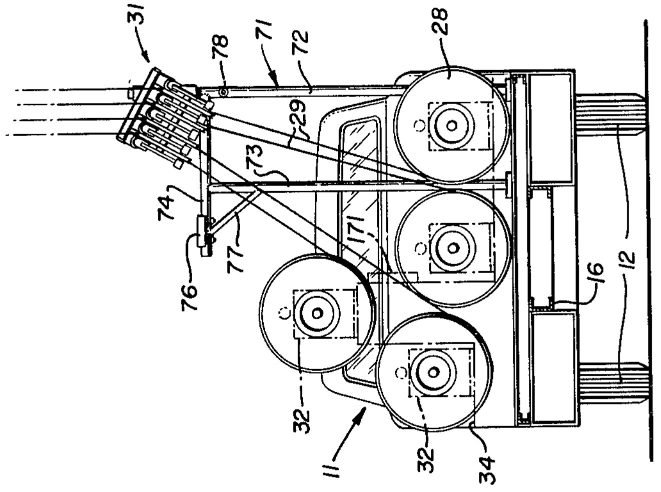
FIGURE 5 is a cross-sectional view taken along the line 5—5 of FIGURE 4.
Figure 7:
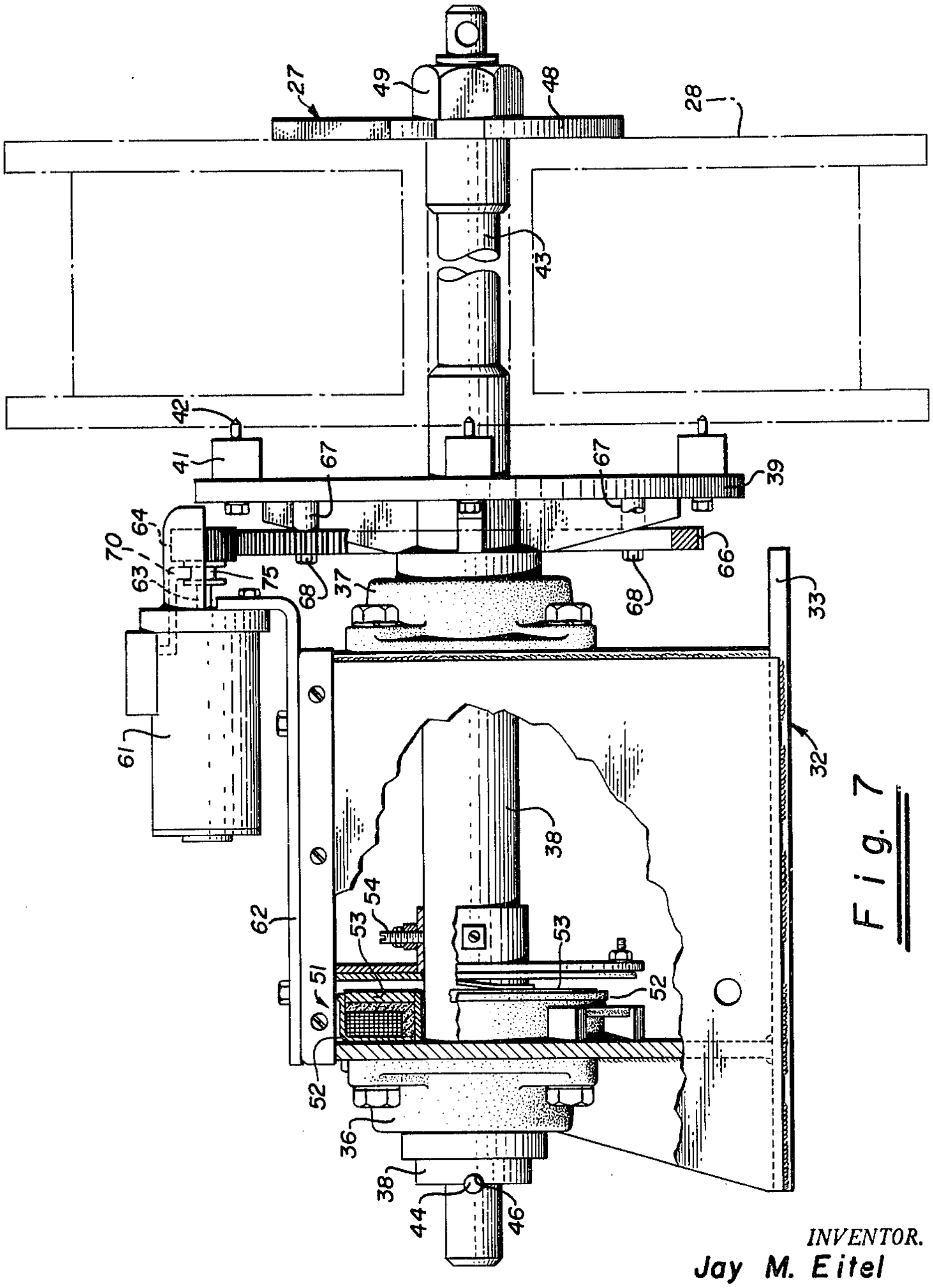
FIGURE 7 is an enlarged detail view, partly in cross-section, showing one of the reel carrying means.

Each of the spindle assemblies 27 consists of a box 32 which has a base plate 33. The base plate 33 is adapted to be secured to the stepped framework 34 mounted on the platform 17 and extending transversely across the platform of the vehicle. The framework 34 has an outline as shown in FIGURE 5 and which serves as a base for the spindle assemblies. A pair of bearings 36 and 37 are mounted in the side walls of the box 32. A sleeve 38 is rotatably mounted in the bearings 36 and 37. A circular drive plate 39 is affixed to the sleeve and is provided with a plurality of circumferentially spaced cylindrical members 41 mounted on the outer margin of the outer face of the same. Drive spikes 42 threadedly mounted in the drive plate extend through the members 41 and are adapted to engage one side of reel 28 as shown particularly in FIGURE 7. A drawbar 43 is slidably mounted within the sleeve 38 and, as shown in the drawing, has a length which is substantially greater than the length of the sleeve 38. The drawbar serves as a spindle for mounting the reel 28. Means is provided for causing the drawbar 43 to rotate with the sleeve 38 and consists of a pin 44 mounted in the drawbar and which engages slots 46 provided in the sleeve 38.

Means is provided for firmly securing the reel 28 to the spindle and for causing the pin 44 of the drawbar 43 to engage the slots 46 and consists of a plate 48 engaging the other side of the reel 28 opposite the side that is engaged by the drive spikes 42. A nut 49 is threaded on the drawbar 43 and urges the one side of the reel 28 into engagement with the spikes 42, and at the same time pulls the drawbar to the right as viewed in FIGURE 7 so that the pin 44 engages the slots 46.

A drag brake 51 (FIGURE 7) is mounted within the box 32 and consists of a magnet assembly 52 which is secured to the box and an armature assembly 53 which is secured to the sleeve by suitable means such as set screws 54. As is well known to those skilled in the art, by varying the current flow through the magnet assembly 52, it is possible to adjust the braking or drag force applied by the brake 51 to inhibit the rotation of the sleeve 38 and the drawbar spindle 43. The current flow in the brake can be adjusted manually or automatically as hereinafter described.

Means is provided on each of the spindle assemblies for rotating the associated reel for tensioning or sagging the conductor payed from the reel as hereinafter described. Such means consists of a motor 61 mounted upon a suitable bracket 62 provided on the box 32. The rotor 61 can be of any suitable type. For example, it can be a fluid operated motor, or an electric motor as shown in the drawing. The motor 61 is provided with an output shaft 63 which drives a pinion 64. The pinion 64 engages a ring gear 66 mounted upon posts 67 provided on the rear side of the drive plate 39 and secured to the posts by suitable means such as cap screws 68.

The motor 61 can be constructed in a manner similar to the manner in which starter motors for automobiles are constructed at the present time. For example, the pinion 64 can be splined on the shaft 63 and moved into and out of engagement with the ring gear 66 by a forked arm 70 which engages a groove 75 in the pinion for moving the pinion into and out of engagement with the ring gear 66 as the motor 61 is energized and deenergized. The forked arm is driven by a solenoid 69 which, when energized, also energizes the motor as hereinafter described.

As explained previously, when the conductors 29 are payed from the reels 28, the conductors pass through conductor guiding means consisting of a bull wheel cluster or assembly 31. The bull wheel assembly 31 is mounted upon a pipe-like framework 71 provided on the platform 17. The framework 71 consists of a pair of spaced vertical posts 72 and 73 mounted behind the cab 14 and secured to the platform 17. The framework 71 also includes a horizontal pipe member 74 which is secured to the post 72 at a point a distance from the top of the post 72 and which is mounted on top of the post 73. As can be seen from FIGURE 5, the member 74 has a length which is substantially greater than the space between the vertical posts 72 and 73. The horizontal member 74 adjacent its outer end carries a cushioning assembly 76 for supporting the boom structure when it is not in use as shown in FIGURE 5. A brace member 77 is secured to the horizontal member 74 at a point below the cushioning assembly 76 and to the vertical post 73 to provide additional reinforcing for the framework 71 so that it will be adequate to support the load of the boom structure. An additional brace 78 is secured to the vertical post 72 and to the platform 17 to prevent substantial movement of the upper end of the framework 71 longitudinally of the vehicle.

Figure 9:
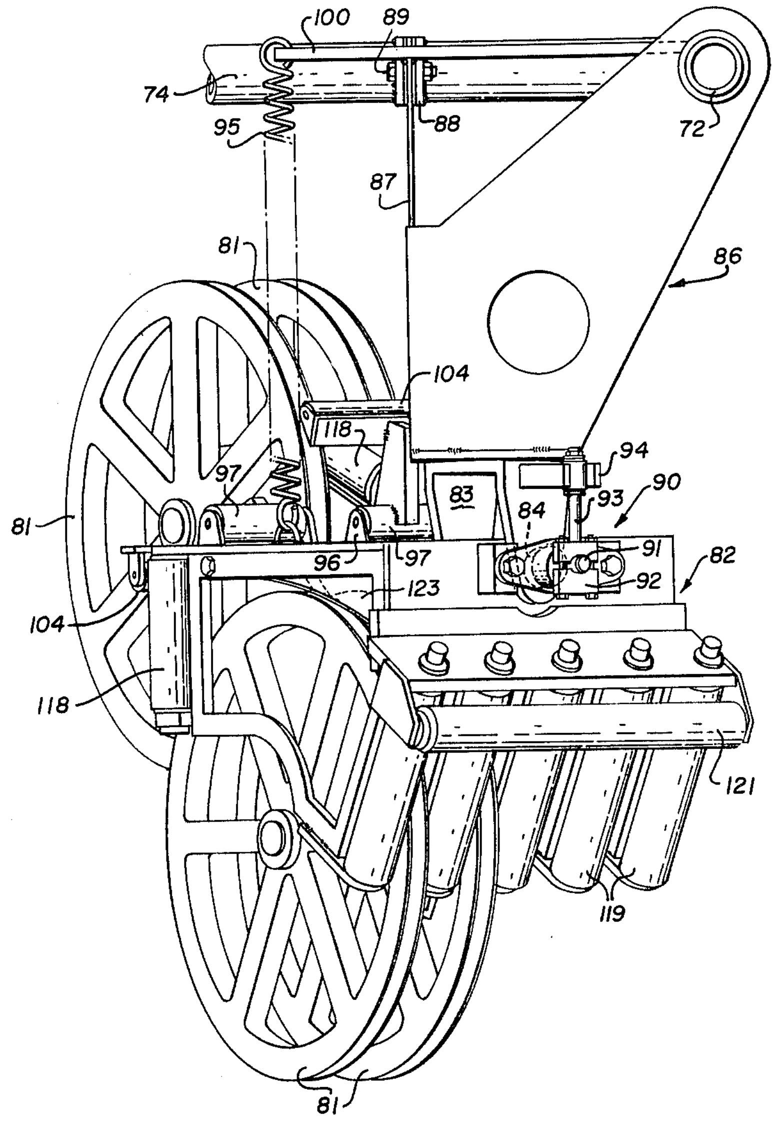
FIGURE 9 is a top plan view of the bull wheel assembly taken along the line 9—9 of FIGURE 8.
Figures 10, 11, 12:
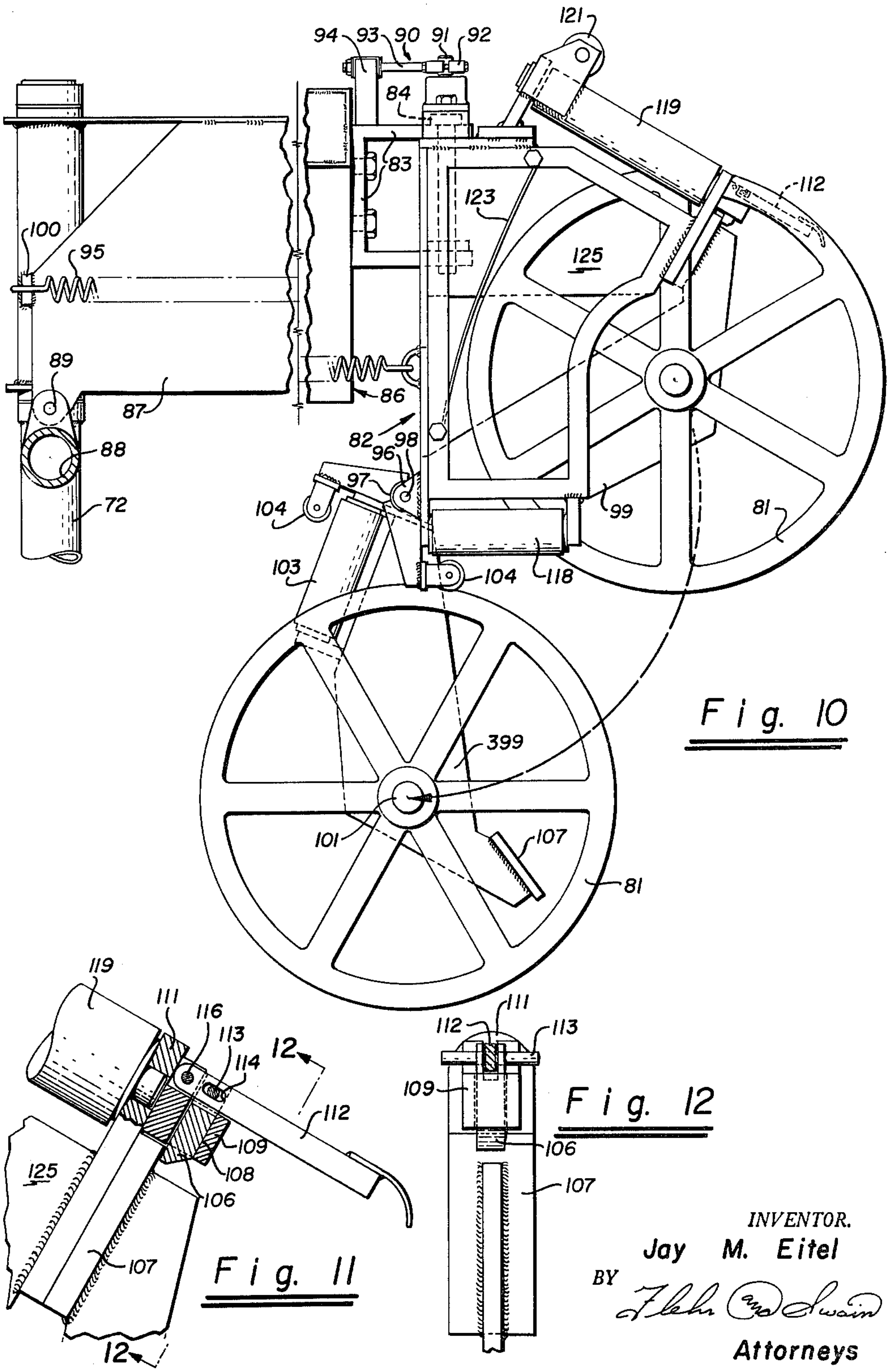
FIGURE 10 is a side elevational view looking along the line 10—10 of FIGURE 8.
FIGURE 11 is an enlarged detail view, partly in cross-section, of the latching mechanism utilized in the bull wheel assembly.
FIGURE 12 is a cross-sectional view taken along the line 12—12 of FIGURE 11.

The bull wheel assembly 31 consists of a plurality of guide members in the form of bull wheels 81 which are rotatably mounted in a bull wheel frame assembly 82 as hereinafter described. As described in my copending application Serial No. 74,606 filed December 8, 1960, the guide members can take the form of a plurality of rollers arranged in an arc. The frame assembly 82 is pivotally mounted in a U-shaped bracket 83 by a pivot pin 84. The bracket 83 is secured to another bracket 86 which is pivotally mounted on the vertical post 72 as shown particularly in FIGURE 10. The bracket 86 is normally maintained in a predetermined position so that it extends at an angle of approximately 45°, as shown in FIGURE 9, by suitable means such as the extension 87 which is connected to a pair of ears 88 mounted on the horizontal member 74 by a bolt 89.

A hydraulic dampener 90 of a type well known to those skilled in the art is mounted on the pivot pin 84 and the bull wheel frame assembly 82. The hydraulic dampener has a movable element 91 to which is attached a clamp or yoke 92. An arm 93 is connected to the clamp 92 and has its other ends resiliently mounted to permit limited sidewise movement in a support member 94. The arm 93, therefore, prevents any substantial movement of the member 91 of the hydraulic dampener. The hydraulic dampener 90 prevents rapid swinging of the bull wheel assembly in a sidewise or back and forth direction as the conductors are payed through the bull wheels.

As shown in the drawings, the frame assembly 82 for the bull wheels is canted so that the bull wheels are inclined at a suitable angle as, for example, an angle of 30°. As hereinafter explained, this is done so that it is possible to string conductors from both sides of the vehicle. To prevent the lower end of the bull wheel assembly from dropping downwardly from this inclined position by force of gravity, yieldable means in the form of a spring 95 is provided which has one end connected to the frame assembly 82 and the other end connected to a bar 100 which is secured to the bracket 86.

Figure 8:
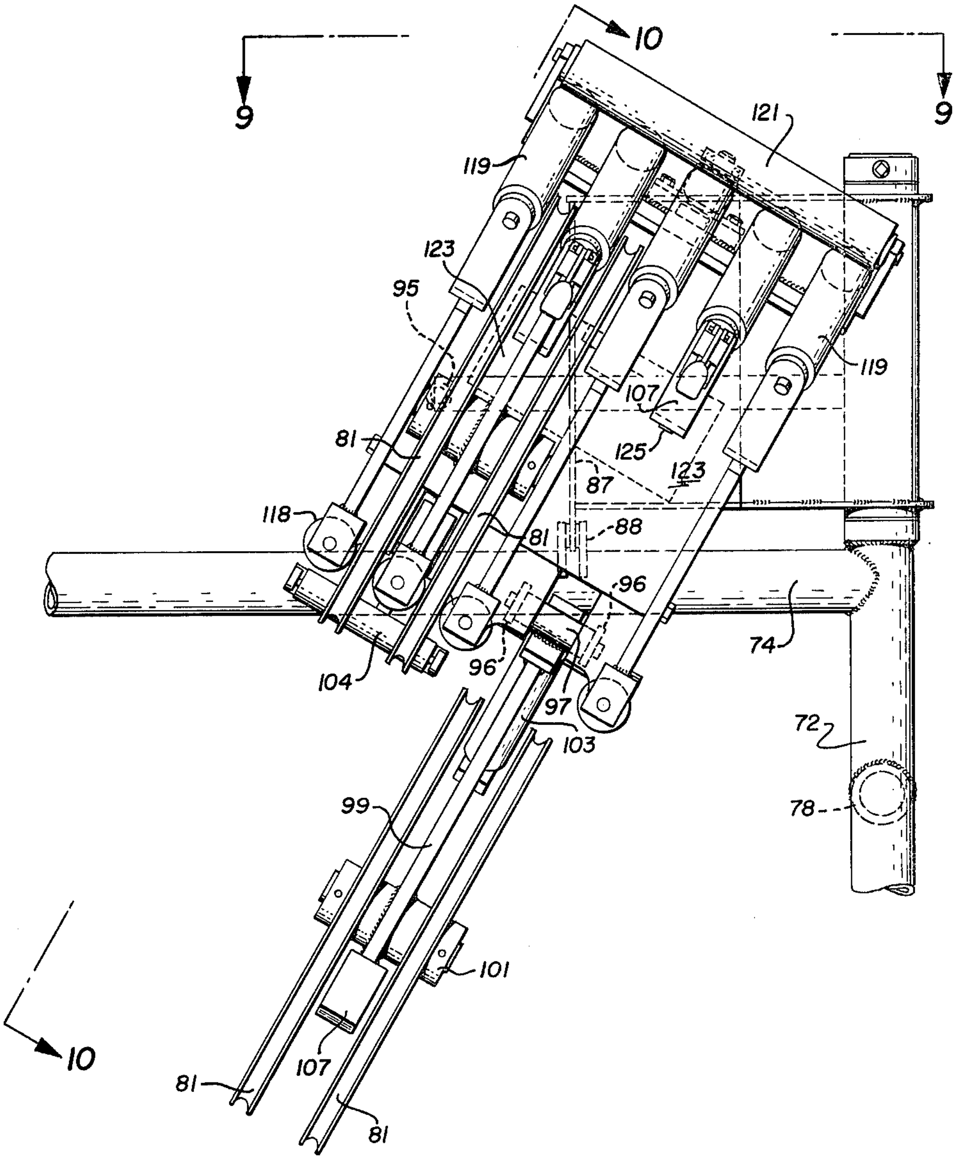
FIGURE 8 is an enlarged detail view of the bull wheel assembly showing one of the bull wheel sub-assemblies in a conductor releasing position.

The frame assembly 82 for the bull wheel assembly is provided with two pairs of ears 96 on the rear side of the frame assembly. A bearing member 97 is rotatably mounted between each pair of ears 96 upon a pin 98. A plate-like member 99 is secured to each bearing member 97 and extends in a plane which is at right angles to the axis of rotation of the bearing members 97. A shaft 101 is affixed on each of the plate-like members 99 and extends from both sides of the plate-like member 99 at right angles to the plate-like member. A pair of bull wheels 81 are mounted on opposite ends of each shaft 101 and on opposite sides of the plate-like member 99 as shown in FIGURE 8.

A roller 103 is mounted on each of the plate-like members 99 and lies in generally the same plane as the plate-like member 99. This roller serves as antifouling means and prevents the conductors from coming into contact with the sharp edges of the plate-like member 99 in the event the conductors entering the bull wheels should be inclined at a substantial angle. An additional roller 104 is provided on each of the plate-like members 99 and extends in a direction at right angles to the plate-like member 99 and the roller 103.

The entire sub-assembly consisting of the plate-like member 99, the rollers 103 and 104, and the pair of bull wheels 81 rotatably mounted thereon is movable between a conductor releasing position and a conductor engaging position by swinging the same about the pivot point provided by the pin 97. The subassembly is maintained in a conductor engaging position by suitable latching means such as the latch pin 106 which is adapted to engage an abutment plate 107 provided on the plate-like member 99. The latch member 106 is slidably mounted in a square hole 108 provided in a member 109 affixed to a plate 111 which is affixed to the frame assembly 82. The latch member 106 is pivotally connected to a lever 112 by a pin 113 extending into a hole 114. The lever is pivotally connected to the block 109 by a pin 116. It is readily apparent that by lifting or raising the lever 112, the latch member 106 will be raised in the hole 108 to release the abutment plate 107 to thereby permit the subassembly consisting of the plate-like member 99 and the bull wheels 81 carried thereby to drop downwardly by force of gravity into the conductor releasing or inserting position shown in FIGURES 8 and 10.

A plurality of additional guide rollers are mounted on the frame assembly 82. For example, two separate pairs of guide rollers 118 are mounted on the lower extremities of the frame assembly 82 and are generally disposed on opposite sides of the associated bull wheel sub-assembly as shown in FIGURE 8 adjacent the lower margins of the bull wheels 81 when the bull wheels are in a conductor retaining position.

A plurality of rollers 119 are mounted on the upper portion of the frame assembly 82 and are disposed on opposite sides of the bull wheels 81 adjacent the upper margins of the bull wheels to guide the conductors or wires as they are payed from the bull wheels. These rollers 119 are rotatably mounted on the frame assembly 82 and are inclined downwardly from the horizontal as shown particularly in FIGURE 10. An additional large roller 121 is mounted near the upper extremity thereof and extends in a direction which is at right angles to the axis of rotation of the rollers 119 to prevent the conductors on the bull wheels from coming into engagement with the frame assembly 82. Antifouling means in the form of a fender 123 is provided for each subassembly and is mounted in the frame assembly 82 between the upper and lower rollers 119 and 118 (see FIGURE 10) and serves to prevent the conductor from slipping over the sides of the bull wheel in the event considerable slack comes into the conductors the fender 123 is provided with a slot 124 to accommodate the plate 125 used for supporting the latching means.

Additional conductor guiding means 126 is mounted on the boom assembly 126 as shown in the drawings. The additional conductor guiding means is identical to that described in my Patent No. 2,949,279 with the exception that additional vertical rollers are provided to accommodate the additional conductors. Thus, where four conductors are being strung, five vertical rollers are required. The operation of the cable guiding device 126 is similar to that described in Patent No. 2,949,279. As described in that patent, it is constructed in such a manner that the conductors can be inserted and removed from the device without cutting the conductors.

The conductor guiding means 126 is supported on the boom assembly 22 by a telescoping tripod-like framework 127. The tripod-like framework consists of a pair of legs 128 which have their lower ends pivotally connected to the arms 130 of the boom assembly 22 supporting the workman's basket 21. The upper ends of the legs 128 are pivotally connected to a collar 129. A tubular member 131 is slidably mounted in the collar 129 and has the conductor guiding means 126 mounted on its forward end. The other end of the tubular member 131 is provided with a stop collar 132 which is adapted to engage another collar-like bracket 133 in which the tubular member 131 is also slidably mounted. The collar-like bracket 133 is pivotally mounted between a pair of ears 134 by pin 136 and which are affixed to the inner section of the boom assembly 22. A pin 138 is provided in the collar 129 and is adapted to engage holes (not shown) in the tubular member 131 to maintain the collar-like member in the retracted position shown in FIGURE 13 or in any number of extended positions as, for example, the position shown in FIGURE 4.

Means is provided for causing the tubular member to be extended at a predetermined angle with respect to the boom assembly 22 annd consists of a tubular member 141 which is pivotally connected to the collar 129. A rod 142 has one end pivotally connected to the collar-like bracket 133 and has its other end extending into the tubular member 141. It is provided with a plurality of holes which are adapted to be engaged by a pin 144 slidably mounted in the end of the tubular member 141 and adapted to be inserted in the holes to position the tubular member at a desired angle with respect to the boom assembly.

From the arrangement shown, it is apparent that the additional conductor guiding means 126 can be positioned a considerable distance above the boom assembly 22 to give the advantage of additional height to the boom assembly 22, and at the same time raising the conductors so that they are out of the way of the workman in the workman's basket 21.

Figures 6, 13:
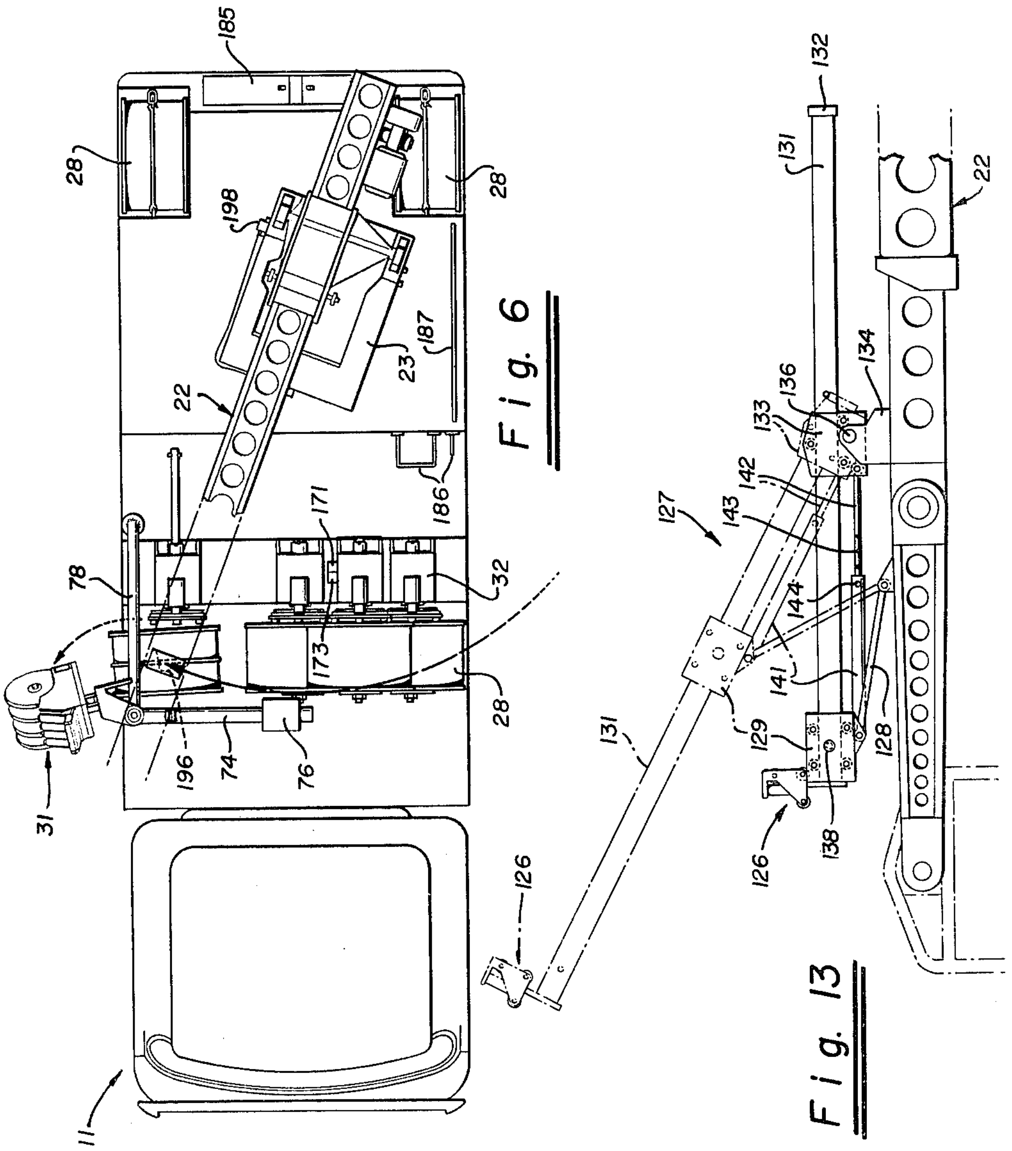
FIGURE 6 is a top plan view showing the use of the boom structure in loading and unloading reels and showing the manner in which the bull wheel cluster or assembly can be moved to an out-of-the-way position.
FIGURE 13 is an enlarged detail view of a portion of the boom assembly showing the mounting for the additional conductor guiding means.

When not in use, the tubular member 131 can be returned to the retracted position shown in FIGURE 13 and locked in this position by placement of the pin 138. The tripod assembly can also be lowered to the position shown in FIGURE 13 and also locked in this position by a pin 144.

Figures 14, 15:
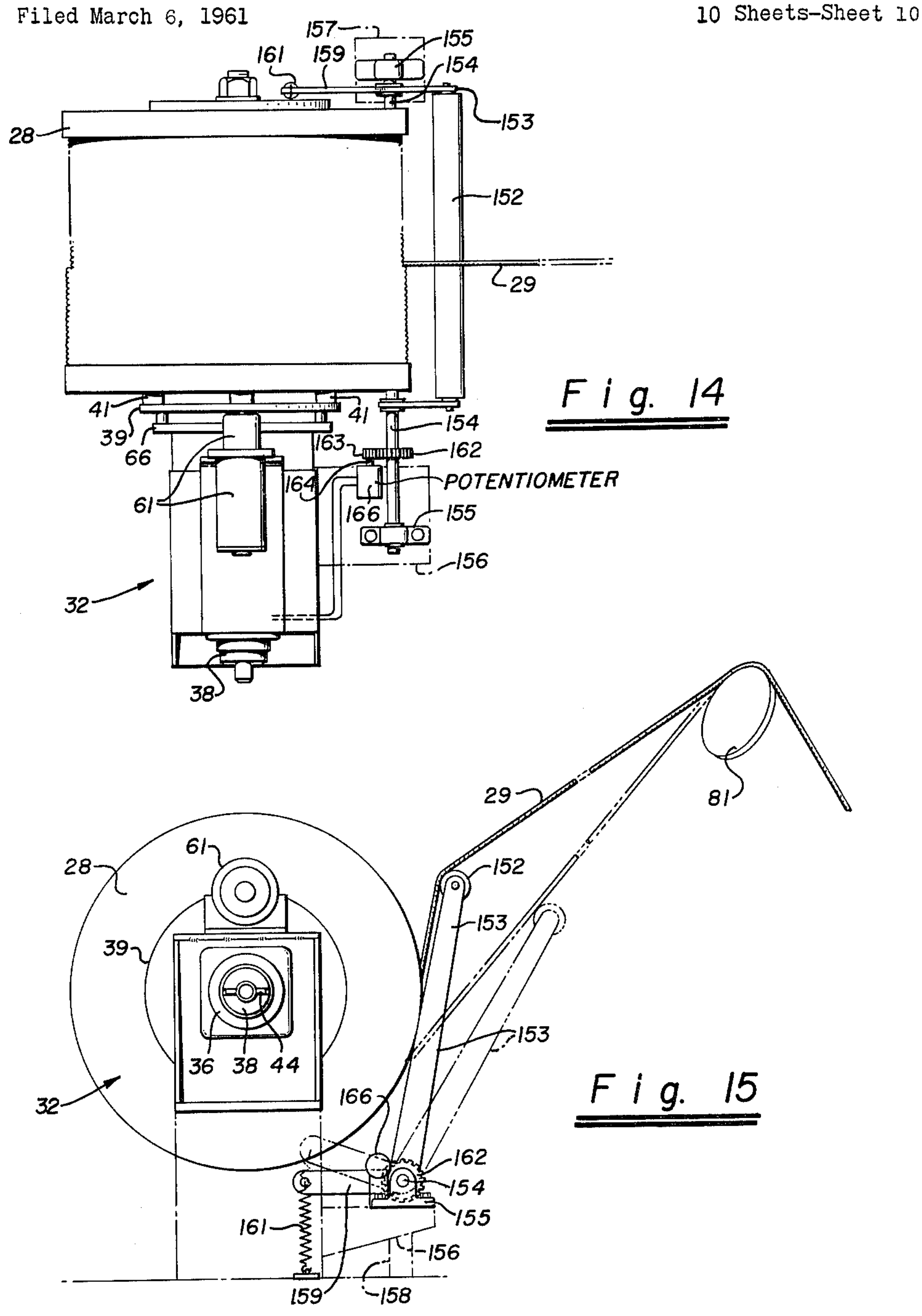
FIGURE 14 is a plan view of one of the spindle assemblies showing the automatic tensioning means.
FIGURE 15 is a side elevational view of the spindle assembly and automatic tensioning means shown in FIGURE 14.

Means 151 may be provided for automatically tensioning the conductors individually as they are payed out as shown in FIGURES 14 and 15. However, as hereinafter explained, such means is not absolutely necessary and manually controlled means can be utilized where desired. The means for automatic tensioning of the conductors consists of an elongate roller 152 which normally has a length which is slightly greater than the width of one of the reels 28. The roller 152 is rotatably mounted between a pair of arms 153 spaced on opposite sides of the reel 28 as shown in FIGURE 14. The lower ends of the arms are affixed to a shaft 154 which is pivotally mounted in pillow blocks 155. One of the pillow blocks is mounted on a bracket 156 fixed to the stepped framework 34 provided for the spindle boxes. The other pillow block is fixed to a plate 157 supported above the platform 17 by a pipe 158 connected to the plate at a point below the pillow block. An additional arm 159 is affixed to the shaft 154 and extends generally in a rearward direction as shown in the drawings. A spring 161 is connected to the free end of the arm 159 and yieldably urges the roller 152 into continuous engagement with the conductor 29. The spring 161 has sufficient strength so that it can displace the conductor from its normal path of travel under normal tension for a purpose hereinafter described. A gear 162 is mounted on the shaft 154 and drives another gear 163 which is connected to the shaft 164 of a potentiometer 166. The potentiometer 166 is mounted on the bracket 156.

The control means for operating the drag brake 51 and the tensioning motor 61 for each of the reels 28 includes a pendant-type control box 171 which is adapted to be removably mounted on the framework 34. It is connected to the circuitry shown in FIGURE 16 by a cable 172. It includes a push button PB for each of the reels 28. When manually controlled means is provided for the drag brake, the control box also includes a potentiometer 166 for each reel which is operated by a control knob 173. When automatic control is provided as hereinafter described, a switch S1 is included in the control box 171 for each of the reels.

Figures 2, 16:
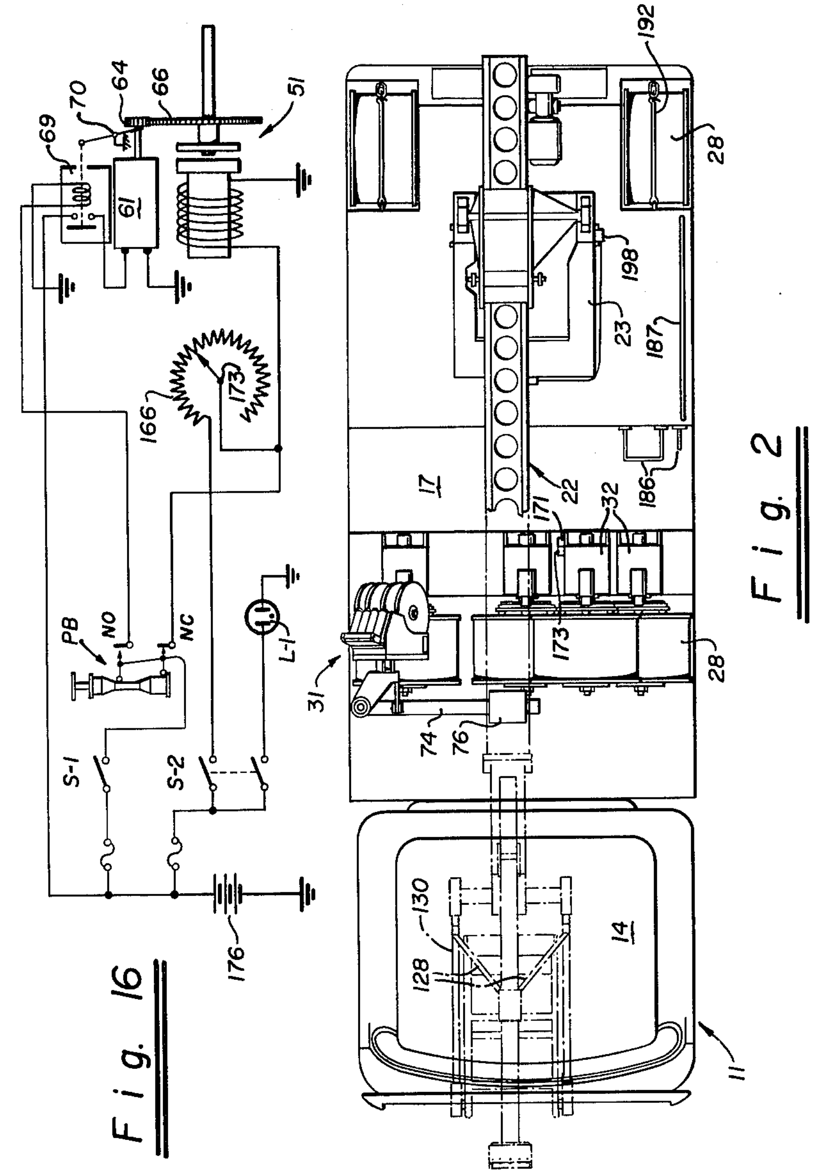
FIGURE 2 is a top plan view of the apparatus shown in FIGURE 1.
FIGURE 16 is a circuit diagram, partially schematic, of the control system utilized in my multiple conductor stringing apparatus.
Figure 3:
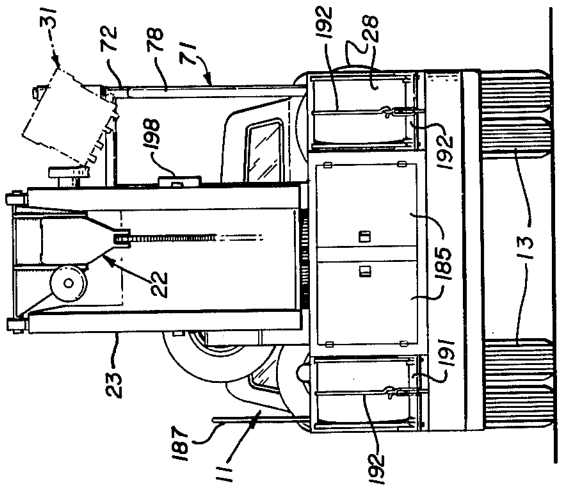
FIGURE 3 is a rear elevational view of the apparatus shown in FIGURE 1.

The control means also includes control circuitry which is shown in FIGURE 16 for interconnecting the various components of the circuit. In addition, it includes a two-pole main control switch S2 which applies power from a battery 176 which is the battery normally provided on the vehicle to each of the rheostats or potentiometers 166. The switch S2 is provided with the second pole for lighting the lamp L–1 so that the back E.M.F. from the brake 51 will not burn out the lamp L–1 when the switch S2 is opened. It also includes a lamp L–1 which indicates when the switch S2 is closed.

The vehicle 11 is provided with several other accessories. For example, it is provided with steps 181 below the platform 17 to facilitate mounting the platform from the ground. It is also provided with a storage compartment 182 mounted below the lift supporting structure and which is accessible through side swinging doors 184 and the rear swinging doors 185. Hand rails 186 and safety rails 187 are mounted on the exterior of the compartment 182 and also facilitate mounting of the platform. A pair of relatively large spaces 188 are provided on opposite sides of the vehicle on the rear of the same. One additional reel 28 may be stored in each space. The reels are mounted upon support members 191 and are held in place by chains 192 which are secured to the frame of the vehicle and to the compartment 182 as shown to hold the reels firmly in place.

Means is provided on the boom assembly 22 in the form of a bracket 196 which can be utilized for raising and lowering reels onto and off of the vehicle 11 as hereinafter described.

Operation and use of my vehicle for stringing multiple conductors may now be briefly described as follows. Let it be assumed that it is desired to utilize the apparatus for stringing the conductors needed for a distribution power system. For example, it may be desired to string two 1–0 (one-naught) conductors and one #4 conductor in a three-wire combination or one 1–0 and two #4 conductors in another three-wire combination. It also may be desirable to string four wires simultaneously as required in certain distribution systems because the apparatus has been designed to accommodate at least this number of conductors.

Figure 4:
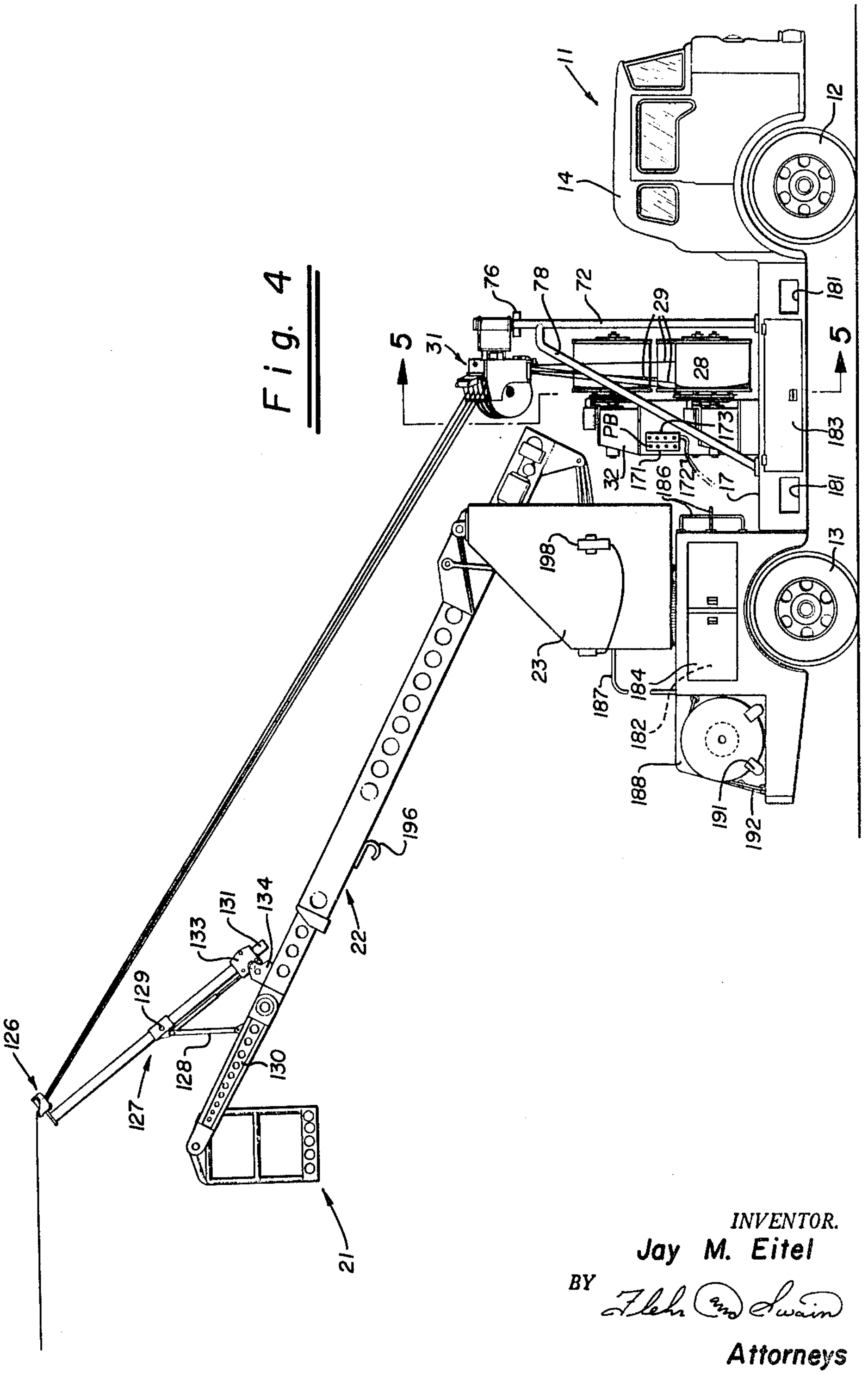
FIGURE 4 is a side elevational view of my multiple conductor stringing apparatus showing it in use for stringing multiple conductors.

With the apparatus in the condition shown in FIGURE 1, it is necessary that the reels be loaded into the reel carrying or spindle assemblies 27. As is well known to those skilled in the art, the electric lift consisting of the lift supporting structure 23, the boom assembly 22 and the aerial platform 21, is provided with control means whereby the same can be operated either from the control basket 21 or from a pendant control 198 which can be utilized for operating the same from the ground or from the platform 17. Such an arrangement is also described in my Patent No. 2,936,847. As shown in FIGURE 4, the pendant control 198 is normally removably mounted on the housing for the lift supporting structure.

Assuming that it is desired to load the reels by an operator standing on the platform 17 of the vehicle, one of the reels 28 is secured to the bracket 196 on the outer section of the boom assembly 22 by suitable means such as a chain (not shown). The boom assembly 22 is then operated to raise the reel and to swing the reel over the platform 17. The bracket 196 is positioned so that the reel can be lifted into a position so that the reel can be moved into the desired position on one of the spindles 43. Before commencing this operation, the bull wheel assembly 31 is moved to the out-of-the-way position shown in FIGURE 6 to facilitate loading of the reels. The drawbar spindle 43 on which it is desired to mount the reel is then retracted or slid rearwardly in the sleeve 38. The nut 49 and the plate 48 are removed so that when the reel 28 is lowered into the proper position, the drawbar or spindle 43 can be pushed into the reel while it is being supported by the boom assembly 22. The plate 48 and the nut 49 are then placed on the drawbar and tightened so that the reel is urged into engagement with the drive spikes 42 and also so that the pin 44 seats within the slots 46. The other reels are mounted in a similar manner. It is apparent that it is desirable that the lowermost reels be loaded first and that the uppermost reels be loaded last.

After the reels have been loaded, the bull wheel assembly 31 is swung back and latched or locked into its normal position. The conductors 29 are then unrolled from the reels and threaded through their respective bull wheels. In performing this threading operation, it is not necessary to release the subassemblies carrying the bull wheels because the ends of the conductors are readily available. The conductors are then threaded through the additional guiding means 126 while the workman's basket 21 is adjacent or near the ground. Then, assuming that it is desired that a workman be in the basket 21, the basket 21 is lowered so that it can normally pivot on the arms provided on the boom assembly 22. The boom extension 131 is then raised to the desired position and also extended to the desired position so that the conductors are payed from the boom assembly 22 at the desired height and angle. In this position, they do not interfere with the operator in the workman's basket 21.

In commencing the stringing operation, the conductors, after they have been passed through the bull wheel assembly 31 and through the additional conductor guiding means 126 are dead-ended on the cross arm or pole in an appropriate manner, after which the vehicle 11 is advanced forwardly as shown in FIGURE 4 to cause the conductors to be payed out from the reels 28. The apparatus can be operated, if desired, with only an operator in the truck and an operator on the platform 17 adjacent the reels 18. However, instead of having the operator on the platform 17, it may be desirable to have the operator in the workman's basket 21 so that he will be in a position to facilitate the placing of the conductors on the cross arms and insulators of the pole line as the conductors are payed out. The operator in the workman's basket can readily ascertain what is occurring and can accordingly position the boom assembly 22 and the conductor guiding means 126 which also can be called a fair lead roller assembly.

During the time the cable is being payed out, it is desirable that the cable be payed out with a predetermined amount of tension. Switch S–2 is closed to light the lamp L–1. The control knob 173 for each of the brakes is adjusted to regulate the drag which is provided by the brake 51 connected to the sleeve 38 mounting each of the spindles 43. However, it has been found that this has certain disadvantages when the vehicle is stopped and started. When the vehicle is started, the force required to overcome the inertia of the reel when the vehicle starts up tends to increase the tension, whereas upon stopping of the vehicle, the contrary occurs to tend to decrease the tension because of the flywheel effect which causes the reel to continue to move.

Thus, where it is desirable to control the tension on the conductor more precisely, the automatic sensing means hereinbefore described can be used. The roller 152 senses the tension on the wire and is positioned to control the potentiometer or rheostat 166 to thereby automatically control the current applied to the brake so that the braking force is adjusted automatically to maintain the desired tension on the conductor. Thus, when the tension is below normal or below a predetermined desired tension, the current flow through the brake is increased to increase the braking force; whereas, when the tension is above normal or above a predetermined desired tension, the current will be decreased to reduce the braking force applied by the brake.

When manual control is adequate, the potentiometers 166 in the control box 171 can be individually adjusted to a predetermined position to produce the required drag on the reels.

It will be noted that the reels 28 are positioned in such a manner that the conductors from the reels can enter the bull wheel assembly 31 at the most advantageous angle. It is for this reason that certain of the reels are at different elevations and one reel is positioned over the other reels as well as for space considerations. As explained previously, the bull wheel assembly 31 is canted at an angle so that the conductors from the reels can enter each of the individual bull wheels at the most desirable angle. The bull wheel assembly is castered so that it can follow the conductors as they are payed from the vehicle. The castering of the bull wheel assembly also makes it possible to place the conductors from either side of the vehicle without any difficulty. It is also possible with the apparatus shown to change the stringing of the conductors from one side of the vehicle to the other in mid-span.

By positioning the reels ahead of the lift supporting structure and locating them in the manner shown on the vehicle, a very favorable weight distribution is obtained which adds greatly to the stability of the vehicle. It also makes it possible to obtain the optimum weight distribution on the front and rear wheels and on both sides of the vehicles.

It will be noted that since separate independently mounted bull wheels are utilized for each of the conductors, the tension on each of the conductors can be readily controlled.

When the stringing operation has been completed, it is well known that it is necessary to tension or sag each of the conductors individually. Means has been provided on the vehicle for making it possible to sag the individual conductors merely by rotating the reels. As soon as it is desired to sag one of the conductors, the switch S1 associated with the reel is moved from the payout position to the rewind position to bypass the potentiometer rheostat 166 to apply the battery potential directly to the brake through the lower contacts of the pushbutton PB to thereby obtain maximum braking force. The push button PB is then operated. Its upper set of contacts are first closed to energize the solenoid in solenoid assembly 69 which first causes operation of the forked lever 70 to move into engagement with the ring gear 66 and then causes energization or starting of the motor 61 through contacts in the solenoid assembly 69. As soon as the motor is energized and upon further depression of the pushbutton PB, the second or lower set of contacts of the pushbutton are opened to deenergize the brake circuit.

With the brake deenergized or disengaged, the motor 61 is able to cause rotation of the reel 28 in a direction to rewind the conductor 29 onto the drum and to thereby tension the conductor. As soon as the conductor has been tensioned sufficiently, the pushbutton PB is released. The second or lower set of contacts is first closed to apply full braking power to hold the conductor at the desired tension. The first or upper set of contacts is then opened to deenergize or stop the motor 61. If additional tensioning is still required, the pushbutton PB can be repeatedly operated until the conductor has been tensioned a sufficient amount.

If desired, it is possible to make the motor 61 large enough so that it draws such a large current from the battery 176 that the current applied to the brake 51 is reduced so substantially that the motor 61 can readily overcome the drag provided by the brake. This would permit use of a simplified circuitry. As soon as the pushbutton PB is released, the motor 61 is deenergized and full voltage is applied to the brake so that the brake will hold the desired tension on the conductor.

After the conductor has been sagged properly, it is dead-ended in a conventional manner. The other conductors are then sagged in the same manner merely by operating the associated pushbuttons. In the sagging operation, it normally is desirable to sag the two outside conductors at the same time to prevent twisting of the cross arms on the poles. Thereafter, the single or two inner conductors could be sagged. During the dead-ending of the conductors, the tripod assembly 127 can be moved to a substantially out-of-the-way position so that it will not interfere with the dead-ending operation.

The sagging of the wires or conductors can be accomplished by an operator standing on the platform 17 and operating the controls on the control box 171. The operator, in this position, while carrying the control box 171, can readily view the sagging operation and determine when the conductors have been properly sagged. He may be assisted in this operation by the operator in the workman's basket. The wires or conductors can also be sagged by the operator in the workman's basket. He can either call down instructions to the operator on the platform 17 or he can be provided with controls which are a duplicate of the control box 171 for sagging the conductors himself. After the conductors have been sagged and dead-ended, the vehicle can proceed to another location to perform the same type of stringing operation.

As is well known to those skilled in the art, many times it is impossible to finish a job within a working day. My apparatus is constructed in such a manner that it is possible to unload the reels from the vehicle and return the vehicle to the utility yard without cutting the conductors. This can be accomplished by dropping the subassemblies of the bull wheel assembly 31 and then removing the conductors. The conductors can also be removed from the conductor guiding device 126 without cutting them by opening of the same as described in my Patent No. 2,949,279. The reels can then be unloaded after the bull wheel assembly 31 has been swung to the out-of-the-way position with the boom assembly 22 in a manner very similar to the manner in which the reels were loaded onto the spindle assemblies. In the same manner, when the vehicle is returned to the location on the following day, the reels can be readily loaded onto the vehicle and the conductors placed in the bull wheel assembly 131 and in the additional conductor guiding means 126.

The mounting of the lift supporting structure 23 and the boom assembly connected thereto a substantially distance from the wheels makes it possible to string the conductors at a higher elevation. It also makes it possible to provide the readily accessible storage compartment 182.

It is apparent from the foregoing that I have provided a new and improved apparatus which is particularly adapted for stringing of multiple conductors simultaneously. The apparatus makes it possible to string the conductors form a moving vehicle at a relatively high speed with a minimum number of personnel, with utmost safety. The conductors can be strung with a predetermined tension and can be sagged by an operator on the vehicle or in the basket. The conductors are payed from the vehicle in such a manner that minimum bends are placed in the conductors as they are being payed from the reels so that the conductors are not unduly stressed at any time. The conductors can be strung from either side of the vehicle without any difficulty.

I claim:

1. In a multiple conductor stringing apparatus, a vehicle of the type having a frame, a boom structure mounted on the frame, said boom structure including means for rotating the outer end of the boom structure about a vertical axis, swinging the same about a horizontal axis and moving the same toward and away from the vehicle, a plurality of conductor carrying reels rotatably and removably mounted on the frame at a stationary location between said vertical axis and the front end of the vehicle, means mounted on the frame and in the vicinity of the conductor carrying reels for simultaneously guiding a plurality of the conductors as they are payed from the reels as the vehicle is advanced, and means mounted on the boom structure for guiding the plurality of conductors as they are payed out over the boom structure.

2. A multiple conductor stringing apparatus as in claim 1 wherein said means for guiding the conductors mounted on the frame consists of a plurality of independently rotatable guide members rotatable on a common axis.

3. A multiple conductor stringing apparatus as in claim 2 wherein the guide members are mounted in a unitary cluster and wherein the guide members are castered for movement about a common axis.

4. A multiple conductor stringing apparatus as in claim 2 wherein each of the rotatable guide members is movable between a conductor releasing position and a conductor retaining position so that the conductors can be inserted and removed from the rotatable guide members without cutting the conductors.

5. A multiple conductor stringing apparatus as in claim 4 wherein said cluster is mounted on one side of the vehicle.

6. A multiple conductor stringing apparatus as in claim 1 together with means for applying a braking force to each of the reels to maintain a predetermined tension on each of the conductors as they are payed out.

7. A multiple conductor stringing apparatus as in claim 1 together with means for rotating the reels to rewind the conductors on the reels to tension the conductors which have been payed out.

8. A multiple conductor stringing apparatus as in claim 6 together with means sensing the tension on each of the conductors and means connected to said sensing means for automatically controlling the braking force applied to each of said reels to thereby maintain a predetermined tension on each of said conductors as they are payed out.

9. A multiple conductor stringing apparatus as in claim 1 together with braking means for applying a braking force to each of the reels to maintain a predetermined tension on the conductors as they are payed out, and motive means for rotating the reels in a direction opposite to the direction the reels are rotated during payout of the conductors for rewinding the conductors onto the reels to place additional tension on the conductors.

10. A multiple conductor stringing apparatus as in claim 9 together with automatic control means for interlocking the motive means and the braking means whereby when the motive means is energized, the braking means is disengaged, and when the motive means is stopped, the braking means is engaged.

11. A multiple conductor stringing apparatus as in claim 10 in which the control means is connected so that the motive means is started before the braking means is disengaged.

12. A multiple conductor stringing apparatus as in claim 1 together with means mounted on the boom structure for loading and unloading reels on the vehicle.

13. A multiple conductor stringing apparatus as in claim 12 wherein the conductor guiding means mounted on the frame is movable into an out-of-the-way position to facilitate loading and unloading of the reels.

14. A multiple conductor stringing apparatus as in claim 1 wherein at least one reel overlies at least one of the other reels.

15. In a multiple conductor stringing apparatus, a vehicle of the type having a frame, a boom structure mounted on the frame and being of the type in which the outer end of the boom structure can be raised and lowered, moved to and fro and rotated about a vertical axis, a plurality of conductor carrying reels rotatably and removably mounted on the frame at a stationary location between said vertical axis and the front end of the vehicle, a plurality of conductor guiding means mounted on the frame adjacent the reels to guide the conductors from the reels as they are payed from the reels, additional conductor guiding means mounted on the boom structure for guiding the conductors individually and means mounted on the boom structure for shifting the position of said additional conductor guiding means relative to the boom structure.

16. A multiple conductor stringing apparatus as in claim 15 together with braking means connected to each of the reels for applying braking forces to the reels so that the conductors are payed from the reels under a predetermined tension.

17. A multiple conductor stringing apparatus as in claim 16 together with motive means for rotating the reels in a direction opposite the direction in which the conductors are payed from the reels for tensioning the conductors.

18. A multiple conductor stringing apparatus as in claim 15 wherein the means mounted on the boom structure for shifting the position of said additional conductor guiding means relative to the boom structure includes an extensible member, one end of the extensible member being pivotally connected to the boom structure, and means for raising and lowering the other end of the extensible member relative to the boom structure, the additional conductor guiding means being mounted on said other end of the extensible member.

19. A multiple conductor stringing apparatus as in claim 18 wherein a workman's basket is mounted on the outer end of the boom structure and wherein the extensible member can be extended so that it overlies the workman's basket and can be positioned so that its outer end is spaced substantially above the workman's basket.

20. A multiple conductor stringing apparatus as in claim 19 wherein the extensible member can be moved to an out-of-the-way position so that it lies substantially parallel to the boom structure and wherein the forward extremity of the extensible member is substantially clear of the workman's basket when the extensible member is in said out-of-the-way position.

21. In a multiple conductor stringing apparatus, a vehicle of the type having a frame, a boom structure mounted on the frame, said boom structure including means for rotating the outer end of the boom structure about a vertical axis, swinging the same about a horizontal axis and moving the same toward and away from the vehicle, reel carrying means mounted on the vehicle at a staionary location between said vertical axis and the front end of the vehicle, a plurality of reels removably carried by and rotatably mounted in the reel carrying means, a length of conductor coiled on each of said reels, means for guiding the conductors as they are payed from the reels and payed out by the boom structure as the vehicle is advanced, and means for applying a braking force to each of the reels to maintain a predetermined tension on each of the conductors as they are payed out.

22. A multiple conductor stringing apparatus as in claim 21 together with means for rotating the reels in a direction opposite the direction in which the conductors are payed out to rewind the conductors onto the reels to place additional tension on the conductors which have been payed out.

23. A multiple conductor stringing apparatus as in claim 22 together with means for sensing the tension on each of the conductors and means connected to said sensing means for automatically controlling the braking force applied to each of the reels to thereby maintain a predetermined tension on each of the conductors as they are payed out.

References Cited by the Examiner

UNITED STATES PATENTS

| | | | |
|---|---|---|---|
| 1,103,143 | 7/1914 | Hunting | 242—75.44 |
| 1,103,153 | 7/1914 | Morse | 242—75.44 |
| 1,864,676 | 6/1932 | Smith et al. | 242—86.5 X |
| 2,250,269 | 7/1941 | Lockwood | 242—86.5 |
| 2,848,123 | 8/1958 | Keys | 254—139.1 X |
| 2,867,390 | 1/1959 | Anrig | 242—86.5 |
| 2,883,068 | 4/1959 | McIntyre | 254—139.1 |
| 2,905,289 | 9/1959 | Lee et al. | 192—2 |
| 2,948,483 | 8/1960 | Peterson | 242—54 |
| 2,949,279 | 8/1960 | Eitel | 254—190 |

MERVIN STEIN, *Primary Examiner.*

JOSEPH J. STRIZAK, RUSSELL C. MADER, *Examiners.*